United States Patent
Kondo

(10) Patent No.: US 10,340,626 B2
(45) Date of Patent: Jul. 2, 2019

(54) CONNECTOR MOUNTING STRUCTURE

(71) Applicant: Sumitomo Wiring Systems, Ltd., Yokkaichi, Mie (JP)

(72) Inventor: Tomoyuki Kondo, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 16/076,469

(22) PCT Filed: Jan. 30, 2017

(86) PCT No.: PCT/JP2017/003120
§ 371 (c)(1),
(2) Date: Aug. 8, 2018

(87) PCT Pub. No.: WO2017/141670
PCT Pub. Date: Aug. 24, 2017

(65) Prior Publication Data
US 2019/0052011 A1 Feb. 14, 2019

(30) Foreign Application Priority Data

Feb. 18, 2016 (JP) .................. 2016-028714

(51) Int. Cl.
*H01R 24/00* (2011.01)
*H01R 13/52* (2006.01)
(Continued)

(52) U.S. Cl.
CPC ......... *H01R 13/5202* (2013.01); *H01R 13/50* (2013.01); *H01R 13/512* (2013.01); *H01R 13/748* (2013.01); *B29C 45/14639* (2013.01)

(58) Field of Classification Search
CPC ............. H01R 23/7073; H01R 13/514; H01R 9/0735; H01R 13/65802; H01R 13/7628
(Continued)

(56) References Cited

U.S. PATENT DOCUMENTS

| 6,547,599 | B2 * | 4/2003 | Kinsey .................. H01R 13/68 439/620.26 |
| 7,029,219 | B2 * | 4/2006 | Kovac .................. F16B 5/0208 411/353 |

(Continued)

FOREIGN PATENT DOCUMENTS

| JP | 3083942 | 2/2002 |
| JP | 2008-41600 | 2/2008 |

(Continued)

OTHER PUBLICATIONS

Inlemalional Search Report dated Feb. 21, 2017.

*Primary Examiner* — Phuong Chi T Nguyen
(74) *Attorney, Agent, or Firm* — Gerald E. Hespos; Michael J. Porco; Matthew T. Hespos

(57) ABSTRACT

A connector mounting structure for mounting a connector (10) including a connector housing (20) made of synthetic resin on a case (50) made of metal by a bolt (80) includes a tubular metal member (55), the bolt (80) being inserted through the metal member, the metal member being configured to contact a seating surface (83) of a head portion (81) of the bolt (80) with the bolt (80) tightened. The connector housing (20) is integrally provided with a mounting piece (30) with an insertion hole (37) through which the bolt (80) and the metal member (55) are to be inserted.

2 Claims, 9 Drawing Sheets

(51) Int. Cl.
  *H01R 13/74* (2006.01)
  *H01R 13/512* (2006.01)
  *H01R 13/50* (2006.01)
  *B29C 45/14* (2006.01)

(58) Field of Classification Search
  USPC .................. 439/660, 701, 493, 607, 610
  See application file for complete search history.

(56) References Cited

U.S. PATENT DOCUMENTS

| | | | | |
|---|---|---|---|---|
| 7,291,024 | B2 * | 11/2007 | Kiyota | B60R 16/0238 |
| | | | | 439/34 |
| 7,510,404 | B2 * | 3/2009 | Koyama | B60R 16/0215 |
| | | | | 180/400 |
| 9,601,864 | B2 * | 3/2017 | Schmidt | H01R 13/5202 |
| 2012/0258635 | A1 | 10/2012 | Sawa | |
| 2012/0322285 | A1 | 12/2012 | Homme | |
| 2014/0322936 | A1 | 10/2014 | Hashimoto | |

FOREIGN PATENT DOCUMENTS

| | | |
|---|---|---|
| JP | 2012-221613 | 11/2012 |
| JP | 5594891 | 9/2014 |

* cited by examiner

CONNECTOR MOUNTING STRUCTURE

BACKGROUND

Field of the Invention

The invention relates to a connector mounting structure.

Related Art

Conventionally, a bolt is used to mount a connector on a case made of metal. In fastening a synthetic resin component by a bolt, a seating surface of the bolt is desirably in contact with a metal surface (metal touch) to prevent the loosening of the bolt. Accordingly, Japanese Unexamined Patent Publication No. 2012-221613 describes using insert molding to embed a metal collar in a mounting piece of a connector housing made of synthetic resin. A bolt then is inserted and tightened into this collar so that the bolt is held in contact with and fastened to a metal surface.

However, in the connector described in Japanese Unexamined Patent Publication No. 2012-221613, the collar made of metal and the mounting piece made of synthetic resin have different thermal expansion coefficients (linear expansion coefficients). Thus, if both are integrated, fractures and cracks may be formed in the mounting piece around the collar when a combined cycle corrosion test (CCT) or a thermal shock test is conducted.

SUMMARY

A connector mounting structure disclosed in this specification uses a bolt for mounting a connector housing made of synthetic resin on a case made of metal. The connector mounting structure includes a tubular metal member, and the bolt is inserted through the metal member. The metal member is configured to contact a seating surface of a head of the bolt with the bolt tightened. The connector housing is provided integrally with a mounting piece with an insertion hole through which the bolt and the metal member are to be inserted.

According to this configuration, the mounting piece made of synthetic resin and the metal member are not integrated by insert molding and the metal member is only inserted into the insertion hole of the mounting piece. Thus, the formation of fractures and cracks in the mounting piece can be suppressed. Further, with the metal member inserted in the insertion hole and the bolt tightened, the metal member is in contact with the seating surface of the bolt. Thus, loosening after tightening the bolt can be suppressed. Furthermore, since it is not necessary to perform insert molding with a metal member such as a collar embedded when molding the mounting piece made of synthetic resin, there is no possibility of contamination, and quality can be improved.

The metal member may be integrated with the case made of metal on which the connector is to be mounted.

In this configuration, the metal member integrally projects from the case, and the seating surface of the bolt is in contact with the metal member by tightening the bolt after inserting this metal member into the insertion hole of the mounting piece. Integrating the metal member and the case in this way reduces the number of components and man-hours.

The invention also relates to a connector mounting structure that uses a bolt for mounting a connector housing made of synthetic resin on a case made of metal. The bolt includes a pressing portion provided between a head and a shaft of the bolt and has a pressing surface to be pressed against the case. The connector housing is provided integrally with a mounting piece that has an insertion hole through which the pressing portion of the bolt is to be inserted. In this configuration, the pressing portion is provided between the head and the shaft of the bolt. This pressing portion is inserted into the insertion hole of the mounting piece and the bolt is tightened. When the bolt is tightened, the case and the pressing surface of the pressing portion are held in contact. By providing a part to be held in contact with a metal surface of the case not on the connector housing, but on the bolt, the formation of fractures and cracks in the connector housing is suppressed.

A rubber ring may be sandwiched between the case and the mounting piece and may be provided in a hold edge part of the insertion hole. A metal part for metal touch (metal member or pressing portion of the bolt) is not integrated with the mounting piece, and the mounting piece is not pressed with a strong force by the bolt. Thus, there is a possibility of rattling between the mounting piece and the case due to dimensional tolerances. Accordingly, the rubber ring is sandwiched between the case and the mounting piece to absorb rattling.

According to the connector mounting structure disclosed in this specification, it is possible to suppress the formation of fractures and cracks in the connector housing while ensuring metal touch when the bolt is tightened.

DETAILED DESCRIPTION

Figure 1:
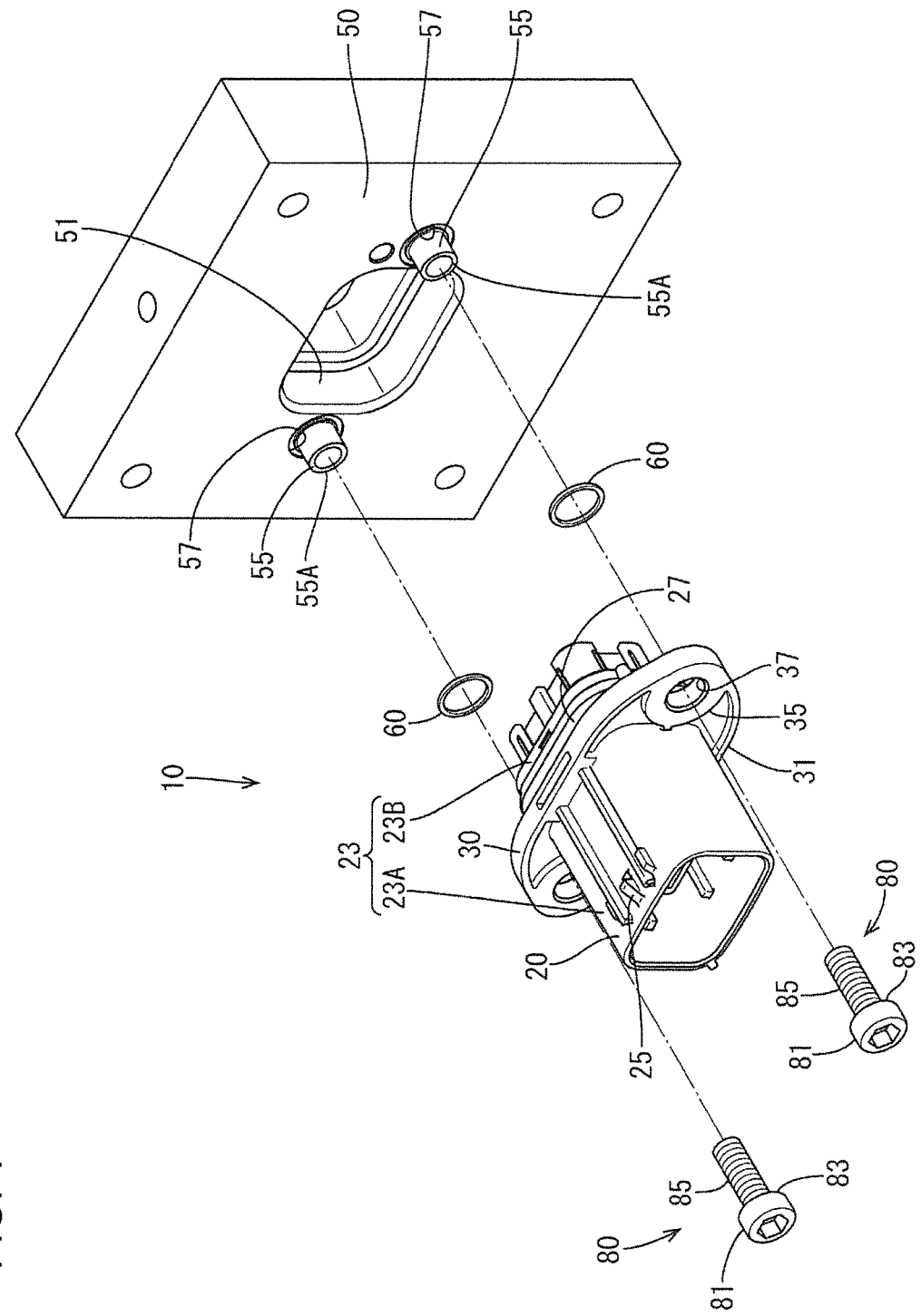
FIG. 1 is an exploded perspective view of a connector mounting structure in a first embodiment.

A first embodiment is described with reference to FIGS. 1 to 4. As shown in FIGS. 1 and 3, this embodiment of the invention uses bolts 80 to mount a connector 10 on a case 50 made of metal by bolts 80. The connector 10 includes a connector housing 20 made of synthetic resin. In the following description, a lower side of FIG. 3 (connecting direction to a mating connector) is referred to as a front side and an upper side of FIG. 3 (mounting direction of the connector 10 on the case 50) is referred to as a rear side concerning a front-rear direction. Further, a vertical direction is based on FIG. 2, wherein upper and lower sides of FIG. 2 are referred to as upper and lower sides.

Figure 2:
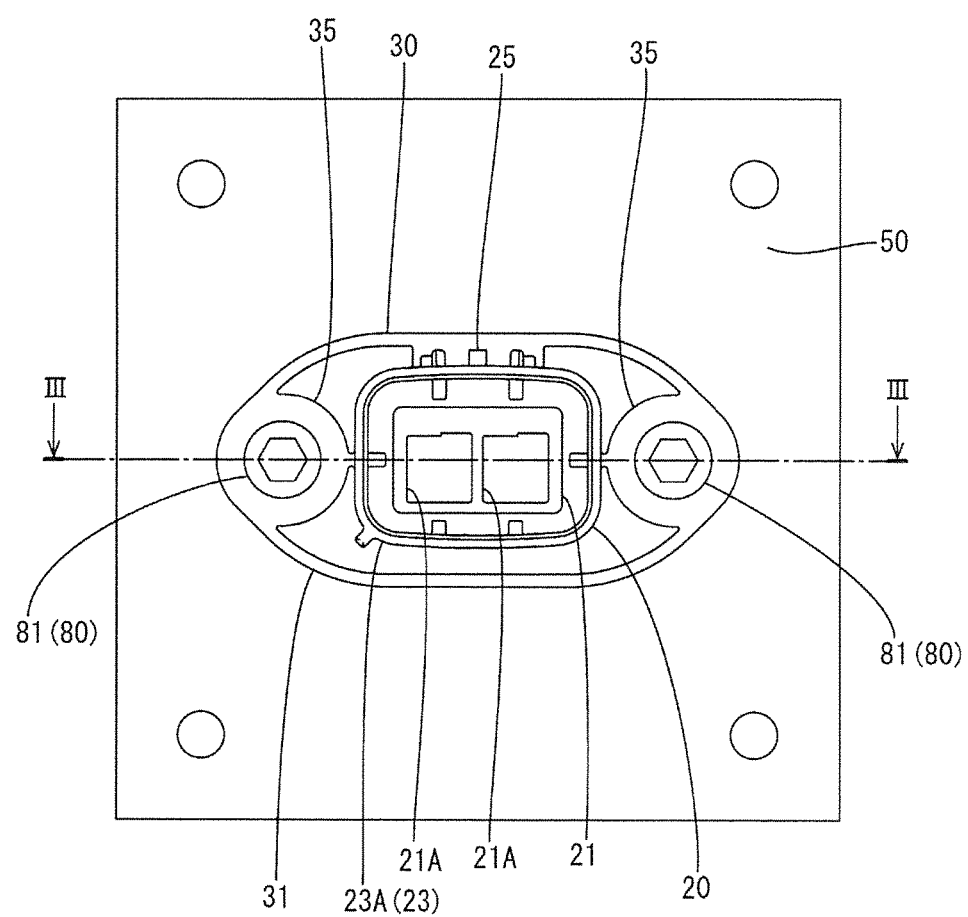
FIG. 2 is a front view in a state where a connector is mounted.
Figure 3:
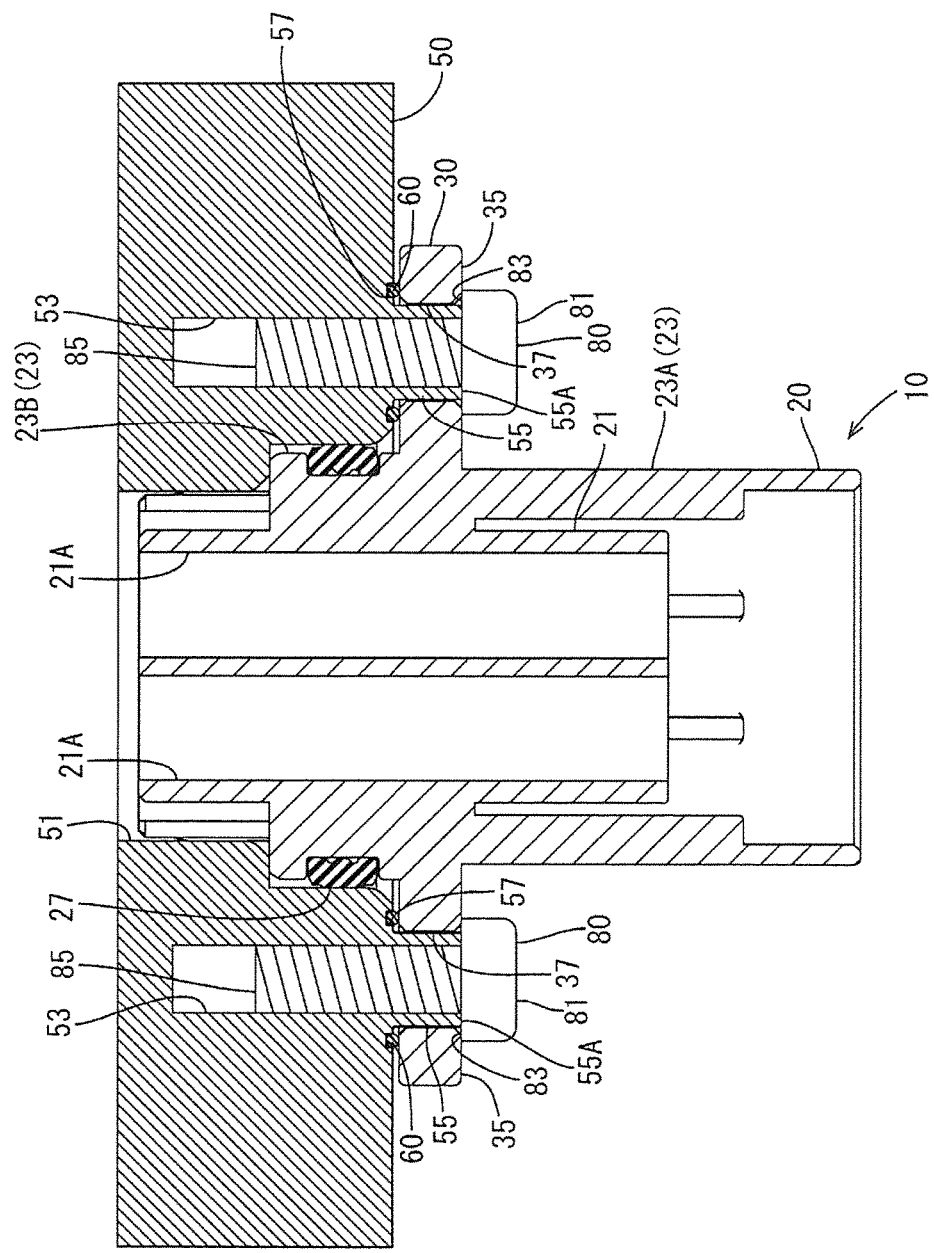
FIG. 3 is a section at position III-III in FIG. 2.

As shown in FIGS. 2 and 3, the connector housing 20 has a laterally long rectangular shape in a front view. The connector housing 20 includes a terminal accommodating portion 21 for accommodating terminal fittings and a receptacle 23 provided on the outer periphery of the terminal accommodating portion 21. Further, a mounting piece 30 is provided integrally with the connector housing 20.

The terminal accommodating portion 21 is substantially in the form of a rectangular column and penetrates through the mounting piece 30 in the front-rear direction. Further, two cavities 21A penetrate the terminal accommodating portion 21 in the front-rear direction, and the terminal fittings can be accommodated into the cavities 21A.

The receptacle 23 is provided on the outer periphery of the terminal accommodating portion 21. The receptacle 23 includes a mating-side receptacle 23A and a case-side fitting portion 23B. The mating-side receptacle 23A projects forward from the front surface of the mounting piece 30 and is to be fit to the mating connector. The case-side fitting portion 23B is to be fit into a mounting hole 51 of the case 50 to be described later. The mating-side receptacle 23A extends forward from the front surface of the mounting piece 30 to a position forward of the front end surface of the terminal accommodating portion 21. Further, an engaging projection 25 projects on the upper surface of the mating-side receptacle 23A and is to be engaged with the mating connector. On the other hand, a sealing member 27 is fit externally on the outer periphery surface of the front end part of the case-side fitting portion 23B for sealing between the outer peripheral surface of a front end part of the case-side fitting portion 23B and the inner peripheral surface of the mounting hole 51.

As shown in FIGS. 1 and 2, the mounting piece 30 bulges out in a width direction from the outer peripheral surfaces of the terminal accommodating portion 21 and the receptacle 23. The mounting piece 30 is a flat plate parallel to a surface of the case 50 and has a substantially elliptical shape (oval shape) in a front view. Further, an outer peripheral part 31 of the mounting piece 30 is thicker than the other flat plate-like part. Contact portions 35 are provided on both end parts of the mounting piece 30 and are to be held in contact with the bolts 80. The contact portions 35 are circular and thicker than the other part of the mounting piece 30 and have a thickness substantially equal to that of the outer peripheral part 31. A circular insertion hole 37 penetrates a center of the contact portion 35 in a plate thickness direction.

Figure 4:
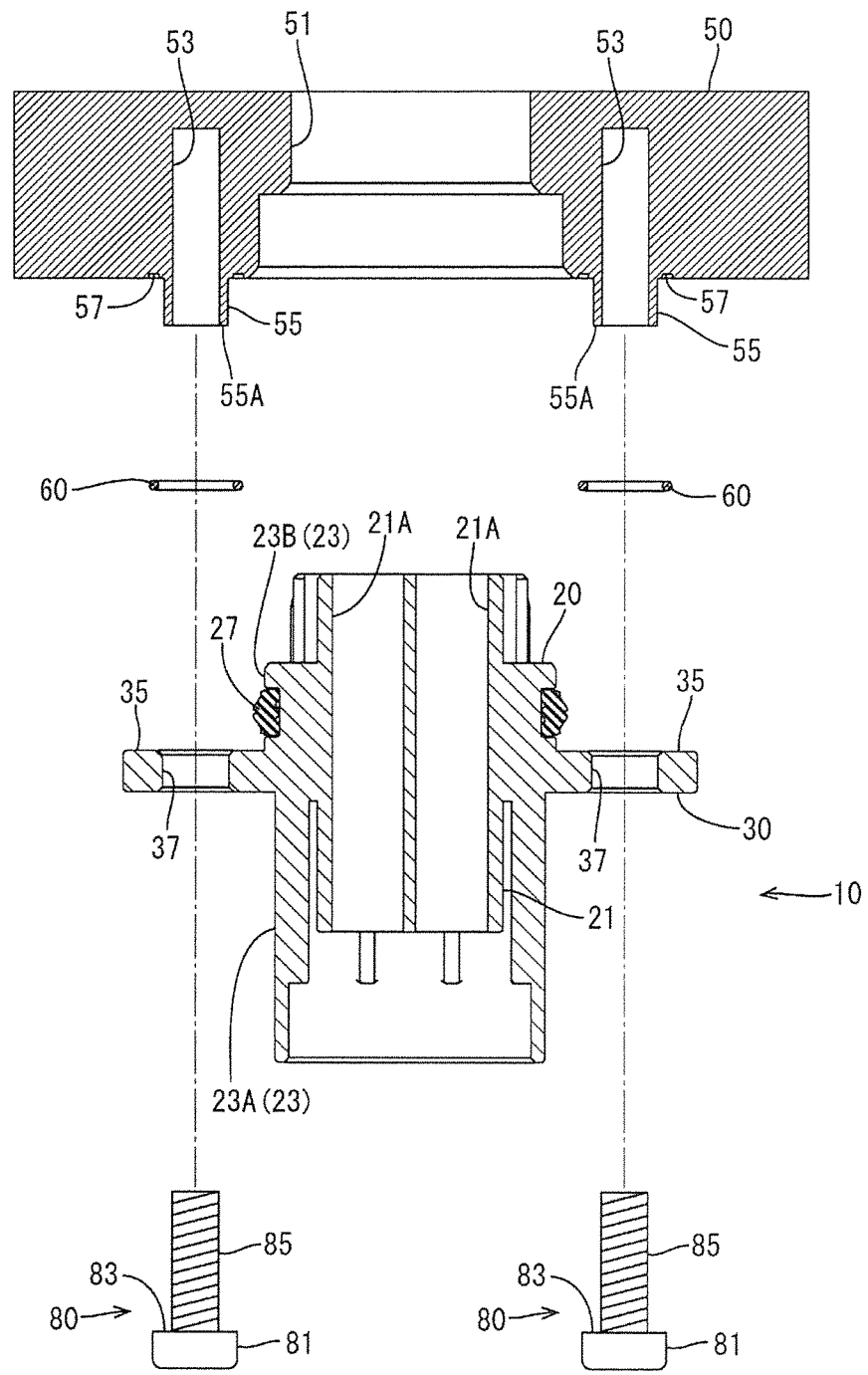
FIG. 4 is an exploded section at the position of FIG. 3.

As shown in FIGS. 1 and 4, the bolt 80 has a hexagonal hole and includes a hollow cylindrical head 81 and a solid cylindrical shaft 85 formed with an external thread. The head 81 has a larger than the shaft 85, and the hexagonal hole is provided in a central part thereof. The rear end surface of the head 81 serves as a seating surface 83 that receives an axial force of the bolt 80. Further, an outer diameter of the head 81 is larger than an inner diameter of the insertion hole 37 and smaller than an outer diameter of the contact portion 35. That is, a part of the seating surface 83 comes into contact with the contact portion 35.

As shown in FIGS. 1 and 4, the case 50 is provided with the mounting hole 51 into which the case-side fitting portion 23B of the connector housing 20 is insertable. A bolt insertion hole 53 is provided at each side of the mounting hole 51. An internal thread is formed in the inner surface of the bolt insertion hole 53 and is to be engaged threadedly with the external thread of the shaft 85 of the bolt 80.

As shown in FIGS. 1 and 3, a hollow cylindrical bos 55 (an example of a "metal member") projects on a hole edge part of the bolt insertion hole 53 of the case 50. The boss 55 integrally projects forward from the front surface of the case 50. The inner surface of the boss 55 is flush with that of the bolt insertion hole 53, and an internal thread is formed continuously from the bolt insertion hole 53. A center axis of the boss 55 is the same as that of the bolt insertion hole 53 and that of the insertion hole 37 of the mounting piece 30. Further, an outer diameter of the boss 55 is substantially equal to or slightly smaller than the inner diameter of the insertion hole 37. A dimension of the boss 55 in the front-rear direction is slightly larger than a thickness (dimension in the front-rear direction) of the contact portion 35 and substantially equal to or slightly smaller than the sum of the dimension of the contact portion 35 in the front-rear direction and a thickness (dimension in the front-rear direction) of a projecting part of a rubber ring 60 to be described later.

As shown in FIGS. 1 and 4, a groove 57 is provided in an outer peripheral part of the boss 55 of the case 50 (hole edge part of the bolt insertion hole 53). The groove 57 extends circumferentially along the outer shape of the boss 55, and an outer diameter of the groove 57 is smaller than that of the contact portion 35. The rubber ring 60 is resilient in the front-rear direction and is fit into the groove 57. The rubber ring 60 is an O-ring, and about half thereof projects from the front surface of the case 50 and can be compressed in the front-rear direction with the rubber ring 60 fit in the groove 57.

Next, an example of the procedure of mounting the connector 10 on the case 50 is described.

First, the rubber rings 60 are mounted into the grooves 57 of the case 50. The connector housing 20 is arranged such that the case-side fitting 23B of the connector housing 20 is fit into the mounting hole 51 of the case 50. The case-side fitting 23B is pushed into the mounting hole 51. Then, the sealing member 27 that is fit externally on the outer peripheral surface of the case-side fitting 23B is held in close contact with the inner peripheral surface of the mounting hole 51 to seal the case-side fitting 23B.

Further, the bosses 55 are fit into the insertion holes 37 of the connector housing 20 when pushing the case-side fitting 23B into the mounting hole 51. The rubber rings 60 contact the rear surfaces of the contact portions 35 and the bosses 55 are disposed inside the insertion holes 37.

The bolts 80 are tightened into the bosses 55 and the bolt insertion holes 53 communicate with the bosses 55. The bolts 80 are tightened into the bolt insertion holes 53 until the seating surfaces 83 of the bolts 80 contact front end surfaces 55A of the bosses 55. Simultaneously, the seating surfaces 83 of the bolts 80 contact the hole edges of the insertion holes 37 in the contact portions 35 so that the bolts 80 fix the connector housing 20 to the case 50. Further, the rubber rings 60 are sandwiched and slightly compressed between the contact portions 35 of the connector housing 20 and the inner surfaces of the grooves 57 of the case 50 as the contact portions 35 move slightly rearward by the tightening of the bolts 80.

In this way, the bolts 80 are tightened to positions where the seating surfaces 83 contact the front end surfaces 55A of the bosses 55. Thus, the seating surfaces 83 receive the axial forces of the bolts 80 and achieve contact (metal touch) with a metal surface of the case 50. Further, the dimension of the boss 55 in the front-rear direction is substantially equal to or slightly smaller than the sum of the dimension of the contact portion 35 in the front-rear direction and the thickness (dimension in the front-rear direction) of the projecting part of the rubber ring 60. Thus, the axial force of the bolt 80 is received mainly by the boss 55 and hardly acts on the contact portion 35 so that the contact portion 35 is not dented by the axial force of the bolt 80. Further, since the rubber ring 60 is sandwiched in a somewhat compressed state between the contact portion 35 and the case 50 and absorbs a rattling caused by dimensional tolerances.

As described above, in this embodiment, the mounting piece 30 made of synthetic resin and the metal member to be held in contact with the bolts 80 are not integrated, and the bosses 55 projecting from the case 50 are inserted only into the insertion holes 37 of the mounting piece 30. Thus, the formation of fractures and cracks due to a difference in thermal expansion coefficient can be suppressed in the mounting piece 30. Further, the bosses 55 are in contact with the seating surfaces 83 of the bolts 80 (metal touch) in a state where the bosses 55 are inserted in the insertion holes 37 and the bolts 80 are tightened. Therefore, the tightened bolts 80 will not loosen. Furthermore, it is not necessary to perform insert molding with metal members, such as collars, embedded in molding the mounting piece 30 made of synthetic resin. As a result, there is no possibility of contamination and quality can be improved.

Further, the bosses 55 integrally project from the case 50, thereby reducing the number of components and man-hours even if the mounting piece 30 and the metal members to be held in contact with the bolt 80 are separate. Note that the bosses 55 to be held in contact with the bolts 80 are not integrated with the mounting piece 30. Accordingly, the seating surfaces 83 of the bolts 80 are pressed strongly against the mounting piece 30 itself. Thus, there is a possibility of rattling between the mounting piece 30 and the case 50 due to dimensional tolerances. However, the rubber rings 60 are sandwiched between the case 50 and the mounting piece 30 to absorb rattling. A second embodiment is described with reference to FIGS. 5 to 9.

A mounting structure of a connector 10 of the second embodiment differs from that of the first embodiment in that pressing surfaces 193 serving as metal touch surfaces with a case 150 are provided on bolts 180. Note that the connector 10 and a connector housing 20 to be mounted on the case 150 are the same as those of the first embodiment and, hence, are not described. Further, members and parts having the same functions as those of the first embodiment are denoted by the same reference signs and are described briefly or are not described. Note that vertical and front-rear directions are the same directions as in the first embodiment.

Figure 5:
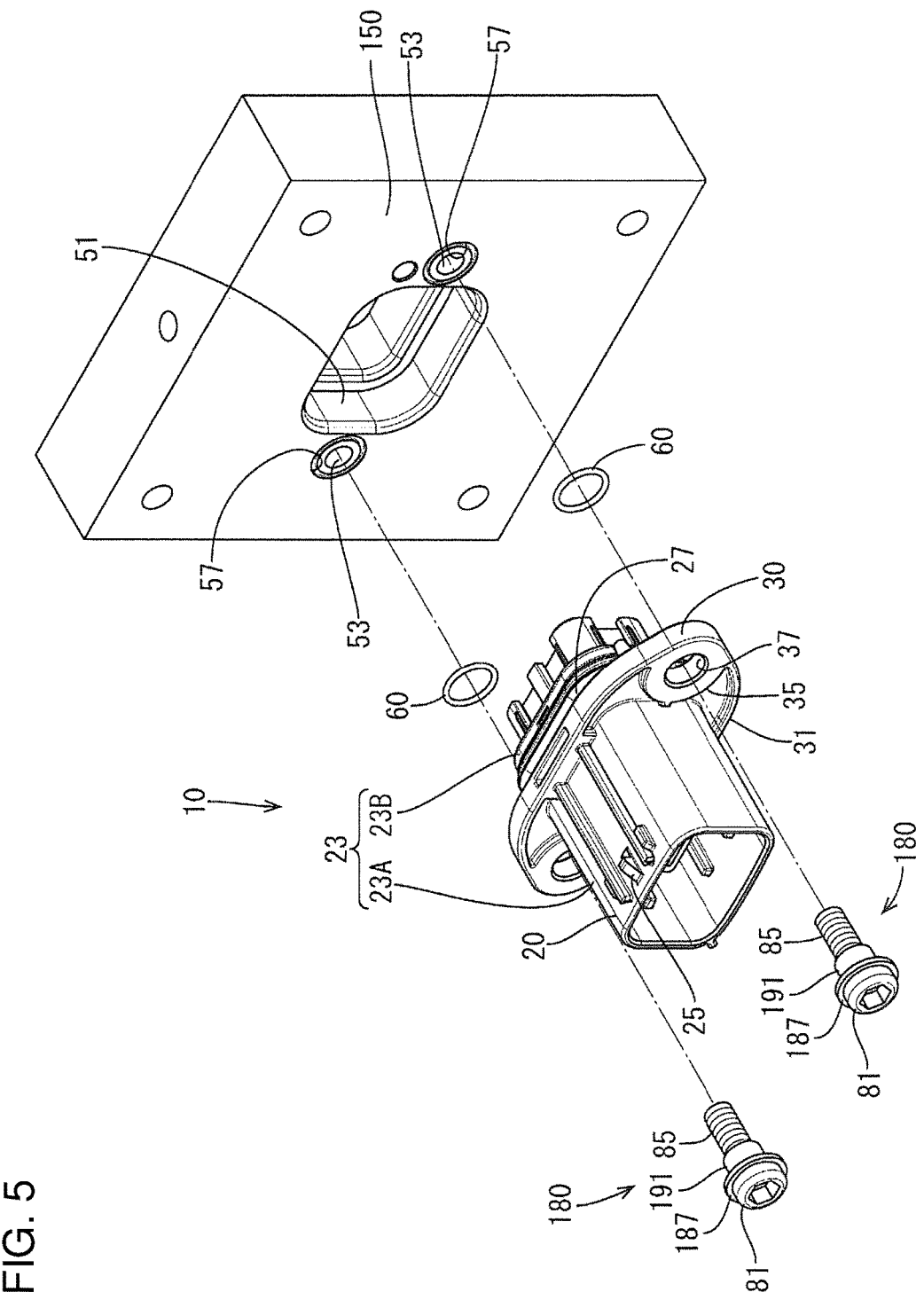
FIG. 5 is an exploded perspective view of a connector mounting structure in a second embodiment.
Figure 6:
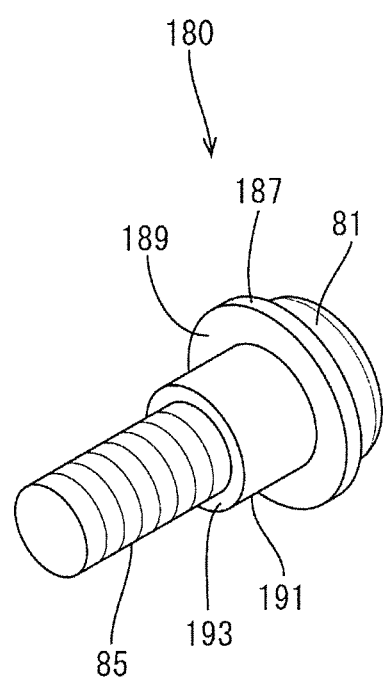
FIG. 6 is a perspective view of a bolt.
Figure 7:
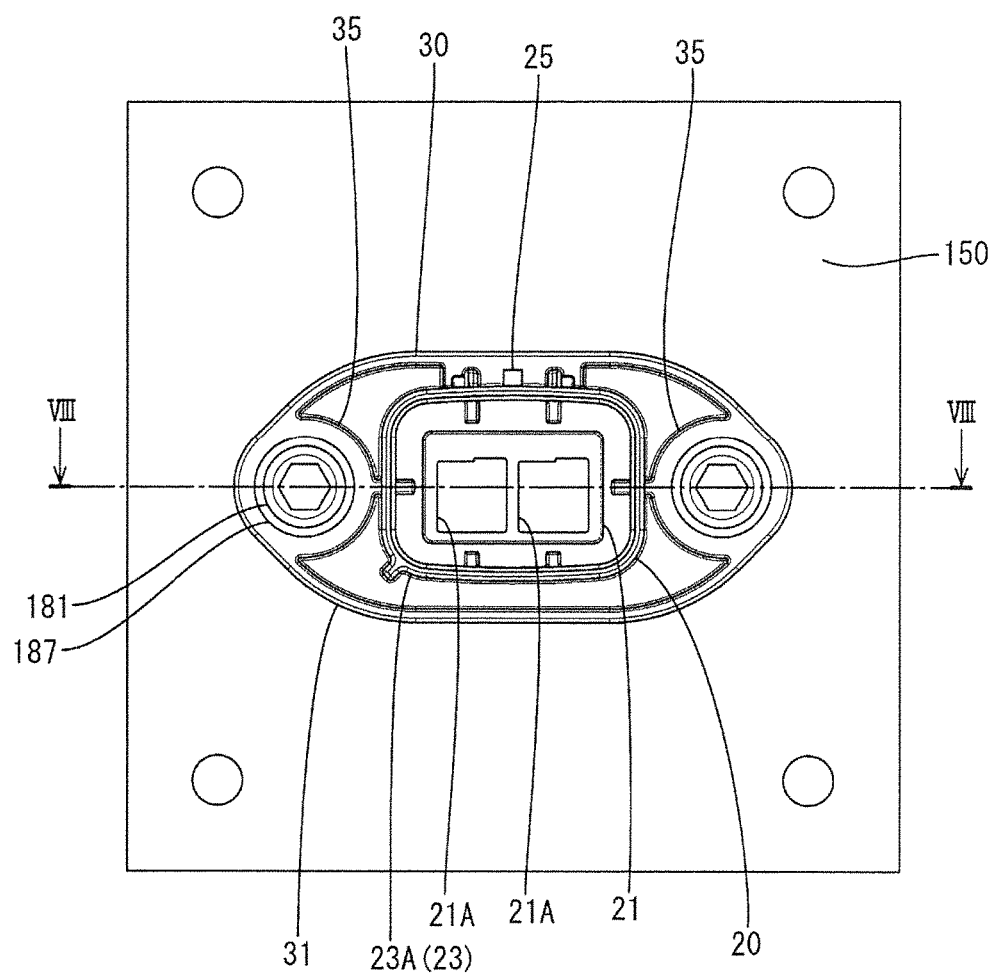
FIG. 7 is a front view in a state where a connector is mounted.

As shown in FIGS. 5 and 6, the bolt 80 includes a hollow cylindrical head 81, a solid cylindrical shaft 85 formed with an external thread, a washer 187 formed by expanding the head 81 in diameter, and a pressing portion 191 provided between the head 81 and the shaft 85. The head 81 has a larger diameter than the shaft 85, and a hexagonal hole is provided in a central part thereof. A rear part of the head 81 is provided with the washer 187 in the form of a flat plate having a larger outer diameter than the head 81. The rear surface of the washer 187 serves as a contact surface 189 configured to contact the front surface of a contact portion 35. Further, the outer diameter of the washer 187 is larger than an inner diameter of an insertion hole 37 and an outer diameter of the contact portion 35. Thus, the contact surface 189 comes into contact with the contact portion 35.

Figure 8:
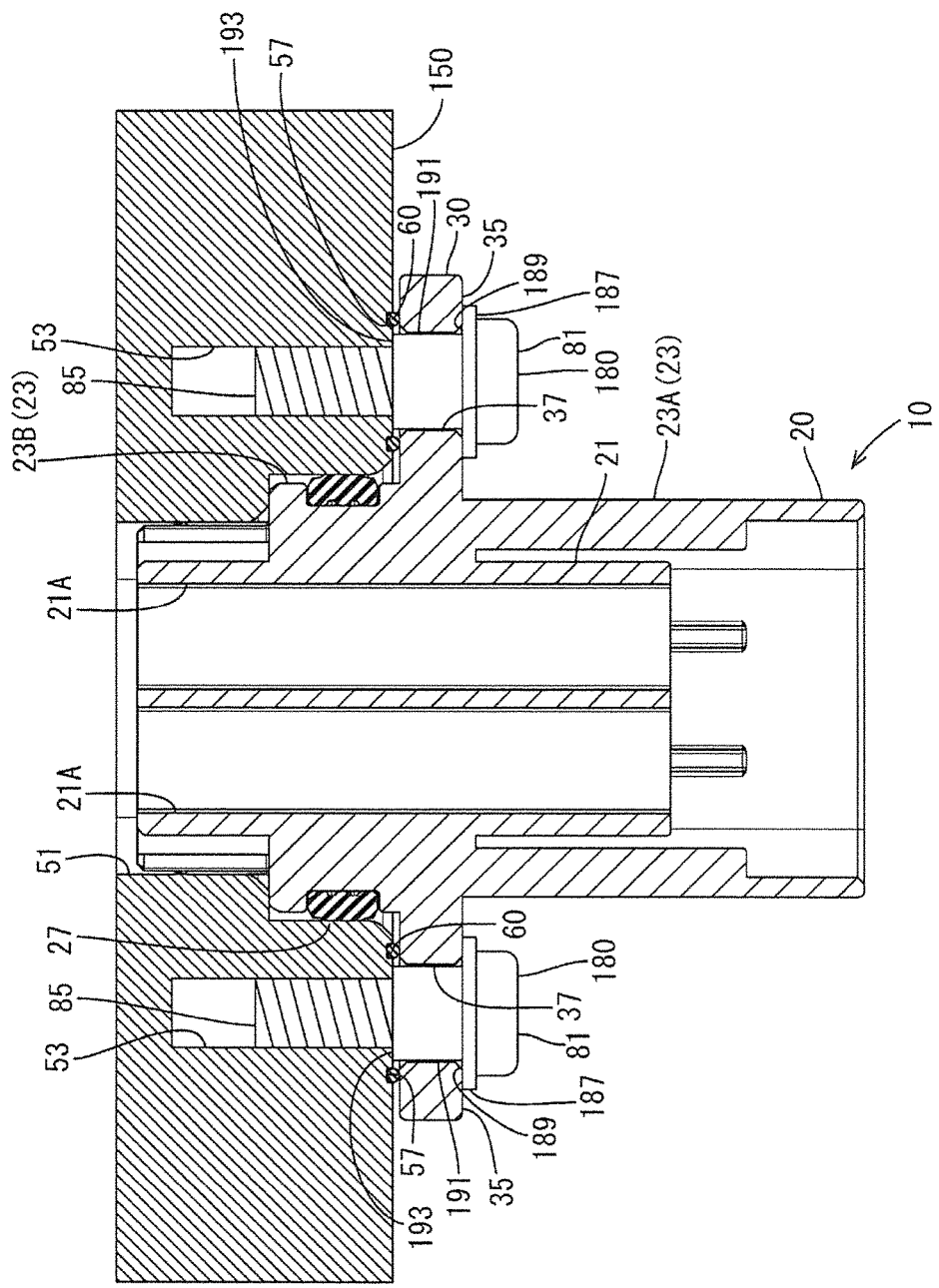
FIG. 8 is a section at position VIII-VIII in FIG. 7.

As shown in FIGS. 6 and 8, the pressing portion 191 has a cylindrical shape. An outer diameter of the pressing portion 191 is smaller than that of the washer 187 and larger than that of the shaft 85. Further, the outer diameter of the pressing portion 191 is substantially equal to or slightly smaller than the inner diameter of the insertion hole 37. A dimension of the pressing portion 191 in the front-rear direction is slightly larger than a thickness (dimension in the front-rear direction) of the contact portion 35 and substantially equal to or slightly smaller than the sum of a dimension of the contact portion 35 in the front-rear direction and a thickness (dimension in the front-rear direction) of a projecting part of a rubber ring 60. The rear end surface of the pressing portion 191 serves as the pressing surface 193 to be pressed against the case 150. After the bolt 180 is tightened, the pressing surface 193 receives an axial force of the bolt 180.

Figure 9:
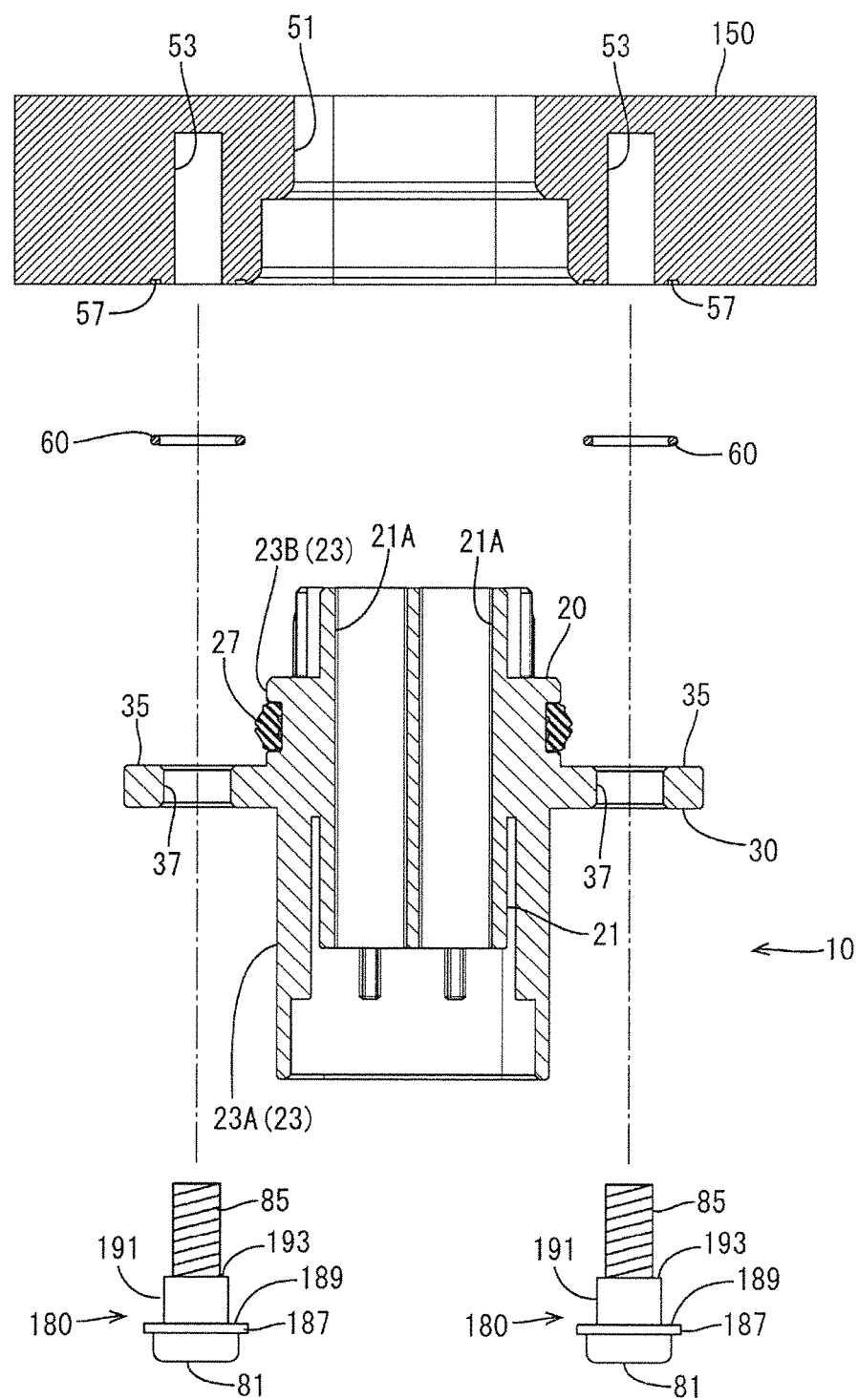
FIG. 9 is an exploded section at the position of FIG. 8.

As shown in FIGS. 5 and 9, the case 150 is provided with a mounting hole 51, boss insertion holes 53 and a grooves 57. Each groove 57 is provided in a hole edge part of the bolt insertion hole 53 and extends circumferentially along the outer shape of the boss insertion hole 53. An outer diameter of each groove 57 is larger than that of the pressing portion 191 and smaller than that of the contact portion 35. The rubber ring 60 is resilient in the front-rear direction and is fit into the groove portion 57.

Next, an example of the procedure of mounting the connector 10 on the case 150 is described.

First, the rubber rings 60 are mounted into the grooves 57 of the case 150. A case-side fitting portion 23B of the connector housing 20 is pushed into the mounting hole 51 of the case 150. When the case-side fitting portion 23B is accommodated at a predetermined position in the mounting hole 51, the rubber rings 60 come into contact with the rear surfaces of the contact portions 35.

Then, the bolts 180 are tightened into the bolt insertion holes 53 until the pressing portions 191 of the bolts 180 are disposed inside the insertion holes 37 and the pressing surfaces 193 of the pressing portions 191 of the bolts 180 contact the edges of the boss insertion holes 53 of the case 150. In this state, the contact surfaces 189 of the bolts 180 are in contact with the edges of the insertion holes 37 in the contact portions 35 and the connector housing 20 is fixed to the case 150 by the bolts 180. Further, the rubber rings 60 are sandwiched and slightly compressed between the contact portions 35 of the connector housing 20 and the inner surfaces of the grooves 57 of the case 150 as the contact portions 35 slightly move rearward by tightening the bolts 180.

In this way, the bolts 180 are tightened to positions where the pressing surfaces 193 of the pressing portions 191 of the bolts 180 contact the edges of the bolt insertion holes 53 of the case 150. Thus, thepressing surfaces 193 for receiving axial forces of the bolts 180 and a metal surface of the case 150 can be in contact (metal touch). Further, the dimension of the pressing portion 191 in the front-rear direction is substantially equal to or slightly smaller than the sum of the dimension of the contact portion 35 in the front-rear direction and the thickness (dimension in the front-rear direction) of the projecting part of the rubber ring 60. Thus, the axial force of the bolt 180 mostly acts on the pressing surface 193 and hardly acts on the contact surface 189. Further, an area of the contact surface 189 with the contact portion 35 is enlarged by the washer 187. Accordingly, a force received per unit area by the contact portion 35 from the contact surface 189 is smaller, and the axial force of the bolt 180 is not likely to dent the contact portion 35. Further, the rubber ring 60 is sandwiched in a somewhat compressed state between the contact portion 35 and the case 50 to absorb rattling caused due to dimensional tolerances.

As described above, in this embodiment, the mounting piece 30 made of synthetic resin and the metal member to be held in contact with the bolts 180 are not integrated, and the pressing portions 191 are provided between the heads 81 and the shafts 85 of the bolts 180. The pressing portions 191 are inserted into the insertion holes 37 of the mounting piece 30 and the bolts 180 are tightened. When the bolts 180 are tightened, the case 150 and the pressing surfaces 193 of the pressing portions 191 are held in contact. Parts that are held in contact with the metal surface of the case 150 are on the bolts 180 and not on the connector housing 20. Thus, fractures and cracks will not form in the connector housing 20.

The case 50 is in contact with the pressing surfaces 193 of the bolts 180 (metal touch) in a state where the pressing portions 191 are inserted in the insertion holes 37 and the bolts 180 are tightened. Thus, the bolts 180 are not likely to loosen after the tightening of the bolts 180. Furthermore, it is not necessary to perform insert molding with metal members, such as collars, embedded when molding the mounting piece 30 made of synthetic resin. Accordingly, there is no possibility of contamination and quality can be improved.

Note that the pressing portions 191 to be held in contact with the case 150 are not integrated with the mounting piece 30 and the contact surfaces 189 of the bolts 180 are not strongly brought into contact with the mounting piece 30. Thus, there is a possibility of rattling between the mounting piece 30 and the case 150 due to dimensional tolerances. However, the rubber rings 60 are sandwiched between the case 150 and the mounting piece 30 and absorb rattling.

The invention is not limited to the above described and illustrated embodiments. For example, the following embodiments also are included in a technical scope.

Although the grooves 57 are provided in the case 50, 150 and the rubber rings 60 are fit thereinto in the first and second embodiments. However, grooves may be provided in a connector housing and rubber rings may be fit therein. Further, no groove portion may be provided.

Although the rubber rings 60 are used in the above first and second embodiments, no rubber ring may be provided.

Although the bosses 55 are integrated with the case 50 in the first embodiment, the bosses 55 and the case 50 may be separate. Further, although the internal threads are formed in the inner surfaces of the bosses 55, no internal thread may be formed.

Although the washers 187 are provided in the second embodiment, the rear end surfaces of the heads 81 may be brought into contact with the contact portions 35 without providing any washer portion.

LIST OF REFERENCE SIGNS

10 . . . connector
20 . . . connector housing
21 . . . terminal accommodating portion
23 . . . receptacle
30 . . . mounting piece
31 . . . outer peripheral part
35 . . . contact portion
37 . . . insertion hole
50 . . . case
51 . . . mounting hole
53 . . . bolt insertion hole
55 . . . bosses(metal member)
55A . . . front end surface
57 . . . groove
60 . . . rubber ring
80, 180 . . . bolt
81 . . . head
83 . . . seating surface
85 . . . shaft
191 . . . pressing portion
193 . . . pressing surface

The invention claimed is:

1. A connector mounting structure that uses a bolt for mounting a connector housing made of synthetic resin on a case made of metal, comprising:
    a tubular metal member including a bolt insertion hole, the bolt being inserted through the bolt insertion hole, the metal member being configured to contact a seating surface of a head of the bolt with the bolt tightened;
    wherein:
    the connector housing has an integral mounting piece with an insertion hole through which the bolt and the metal member are inserted; and
    a groove extends circumferentially around an edge of the bolt insertion hole in the case and a rubber ring is provided in the groove and sandwiched between the case and the mounting piece.

2. A connector mounting structure that uses a bolt for mounting a connector housing made of synthetic resin on a case made of metal, comprising:
    a tubular metal member, the bolt being inserted through the metal member, the metal member being configured to contact a seating surface of a head of the bolt with the bolt tightened;
    wherein:
    the connector housing is provided integrally with a mounting piece with an insertion hole through which the bolt and the metal member are inserted; and
    the metal member is integrated with the case.

* * * * *